United States Patent [19]

Mente

[11] Patent Number: 4,917,903

[45] Date of Patent: Apr. 17, 1990

[54] APPARATUS FOR PRODUCING DECORATIVE SEAMS ON FILMS SHAPED USING A DRAWING METHOD

[76] Inventor: Kurt Mente, Jurgenweg 6, D-3000 Hannover 21, Fed. Rep. of Germany

[21] Appl. No.: 141,745

[22] Filed: Jan. 11, 1988

[30] Foreign Application Priority Data

Jan. 15, 1987 [DE] Fed. Rep. of Germany ....... 3700960

[51] Int. Cl.⁴ ...................... B29C 59/02; B29C 51/20
[52] U.S. Cl. ................................ 425/174.4; 264/292; 264/293; 264/296; 264/DIG. 46; 264/DIG. 66; 264/DIG. 50; 264/25; 264/522; 425/388; 425/394; 425/DIG. 13; 425/DIG. 60; 425/385
[58] Field of Search ......................... 425/388, 383–385, 425/394, 174.4, DIG. 13, DIG. 44, DIG. 60, DIG. 124, 174.8 E; 264/554, 547, DIG. 50, 522, 292, 293, 294, 296, 509, 24, 25, DIG. 46, DIG. 66, DIG. 78; 156/583.7; 219/243, 228

[56] References Cited

U.S. PATENT DOCUMENTS

| | | | |
|---|---|---|---|
| 2,365,637 | 12/1944 | Helwig | 264/547 |
| 2,468,697 | 4/1949 | Wiley | 264/547 |
| 3,219,307 | 11/1965 | Leeds et al. | 425/388 |
| 3,280,428 | 10/1966 | Watts | 425/388 |
| 3,319,045 | 5/1967 | Tucker | 219/243 |
| 3,450,807 | 6/1969 | Cheney | 425/388 |
| 3,568,254 | 3/1971 | Stolki | 425/388 |
| 3,781,394 | 12/1973 | Houghton | 425/388 |
| 3,982,991 | 9/1976 | Hamm et al. | 219/243 |
| 4,125,760 | 11/1978 | Nyfeler | 219/243 |
| 4,130,623 | 12/1978 | Walter | 425/385 |
| 4,223,050 | 9/1980 | Nyfeler et al. | 264/293 |
| 4,426,573 | 1/1984 | Fudickar et al. | 219/243 |
| 4,547,141 | 10/1985 | Ruschmann | 425/385 |

FOREIGN PATENT DOCUMENTS

| | | | |
|---|---|---|---|
| 0192184A2 | 2/1986 | European Pat. Off. | |
| 2026427 | 12/1971 | Fed. Rep. of Germany. | |
| 3108571 | 7/1982 | Fed. Rep. of Germany. | |
| 1095290 | 12/1967 | United Kingdom | 264/284 |
| 1470498 | 4/1977 | United Kingdom | 264/293 |
| 2172542A | 9/1986 | United Kingdom | 425/384 |

Primary Examiner—Jeffery Thurlow
Assistant Examiner—Mathieu Vargot
Attorney, Agent, or Firm—Cushman, Darby & Cushman

[57] ABSTRACT

For the production of decorative seams on dashboards or the like, molded of thermoplastic material by the deep-drawing method, or the like, a soft heated embossing die having a negative decorative seam is pressed briefly, at the instant of the deformation of the dashboard or the like, against the molding tool covered with the film. Elastic embossing cushions are glued into the molding tool, thereby providing that the decorative seam will have a convex curvature.

7 Claims, 2 Drawing Sheets

APPARATUS FOR PRODUCING DECORATIVE SEAMS ON FILMS SHAPED USING A DRAWING METHOD

FIELD OF THE INVENTION

The invention relates to an apparatus for producing decorative seams on films shaped by deep drawing or molding made from thermoplastics, and, in particular, for soft trim in motor vehicles,

BACKGROUND OF THE INVENTION

In shaped plastic elements, in particular in expandable soft trims for motor vehicles such as for dashboards or for use as interior coverings, it is often desirable to provide a decorative seam, or a plurality of decorative seams, on the various plastic elements for the sake of appearance. This goal can be attained by using what is known as the powder slush method.

This known method uses powder (pulverized plastic) and electroforming molds for the plastic element that is to be produced and provided with a decorative seam. The powder is distributed on the mold wall by pivoting motions of the electroforming mold, and by means of an ensuing solidification of the powder, the plastic element—such as a dashboard—corresponding to the electroforming mold can be produced; in principle, it is also possible to produce decorative seams using this method.

However, the known powder slush method has serious disadvantages. Since not all plastics can be pulverized, the known method is restricted in terms of the field of its application. In practical usage, certain peripheral conditions such as pourability, granular consistency of the powder, and so forth must also be taken into consideration, because these parameters are highly important in the production of plastic elements. In practice, this condition further limits the field of application.

Furthermore, high tool costs and machine cost prices in the known method result in considerable expenses that are passed on to the sale price of the finished plastic element. Finally, the production of a shaped plastic element using the powder slush method is quite time-consuming, which is also unfavorable from an economic standpoint.

SUMMARY OF THE INVENTION

In order to overcome these disadvantages, it is the object of the invention to disclose an apparatus for producing decorative seams in plastic elements that permits cost-effective and rapid manufacture.

Diverging from the known powder slush method, the invention takes a completely different course, proceeding from a proposal, described by the present applicant in European Patent Application No. 86 101 798.6, for a method based on a deep-drawing method.

In this apparatus for producing a shaped plastic element, in particular an expandable soft motor vehicle trim from a film of deep-drawable thermoplastic, the film, held by a tentering frame, is heated to the heat-shaping temperature of the plastic and in a pre-molding step is curved to match the general contour of a molding tool. Subsequently, after the molding tool is introduced into the curvature, the film is deformed to its final shape by applying the back side of the film to the surface of the molding tool by means of a pressure difference and removing it from the tool after cooling. The decisive step in the method is that prior to the final deformation, a thick region on the back side of the film is heated by high radiant intensity to the plastic temperature range of the plastic.

The significant advantage of this apparatus is that it prevents deformation caused by strong sunlight in hot climatic zones, or cracking caused by shrinkage, in the manufactured plastic element, such as a motor vehicle dashboard.

By utilizing the deep-drawing apparatus of the present invention, decorative seams that are very clean in their appearance and look practically the same as original seams can be created with the aid of the heated embossing die, which is provided with a negative decorative seam (as a mold) and which at the instant of deformation of the entire plastic element is pressed briefly against the molding tool covered with the film. An important characteristic is the heating of the embossing die, with which an optimal heat transition for the deformation is enabled.

Overall, the invention provides an advantageous way of producing decorative seams, and this production is simple to integrate into the manufacturing process of a molded plastic element. The expense entailed by the additional embossing die is comparatively low, so that the novel method is also advantageous from an economic standpoint. In comparison with the powder slush method referred to to at the outset above, substantially shorter manufacturing cycle times can be used in the invention, which is another advantage.

In one embodiment of the invention, an elastic embossing cushion is embedded in the surface of the molding tool in the vicinity of the decorative seam, and the embossing die is then pressed with its negative decorative seam against the film, the embossing die being heated to approximately 160 C. These temperature values advantageously assure unproblematic production of decorative seams in combination with the process of molding the plastic element as a whole.

To enable heating of the embossing die as required, electrically heated wires embedded in the embossing die are used.

An embossing die having a heatable embossing layer on the surface of which the negative decorative seam is disposed is located inside the molding box. By pressing the embossing die against the molding tool covered with the film, the desired decorative seam can thus be produced by simple means.

In a second embodiment of the invention, the embossing layer comprises a silicon composition in which electrically heatable wires are embedded, and the embossing layer, embodied in this way, is disposed on a die holder. This simple construction of the complete embossing die is easy to make, resulting in low production costs.

In a third embodiment of the invention, a compressed-air cylinder is provided as the drive means for the embossing die, thereby making it possible to press the embossing die briefly against the film-covered molding tool and subsequently remove it.

Further advantageous features of the invention will become apparent from the ensuing description.

The invention will be better understood from the ensuing detailed description of the exemplary embodiment shown in the drawings.

DETAILED DESCRIPTION OF THE PREFERRED EMBODIMENT

Figure 1:
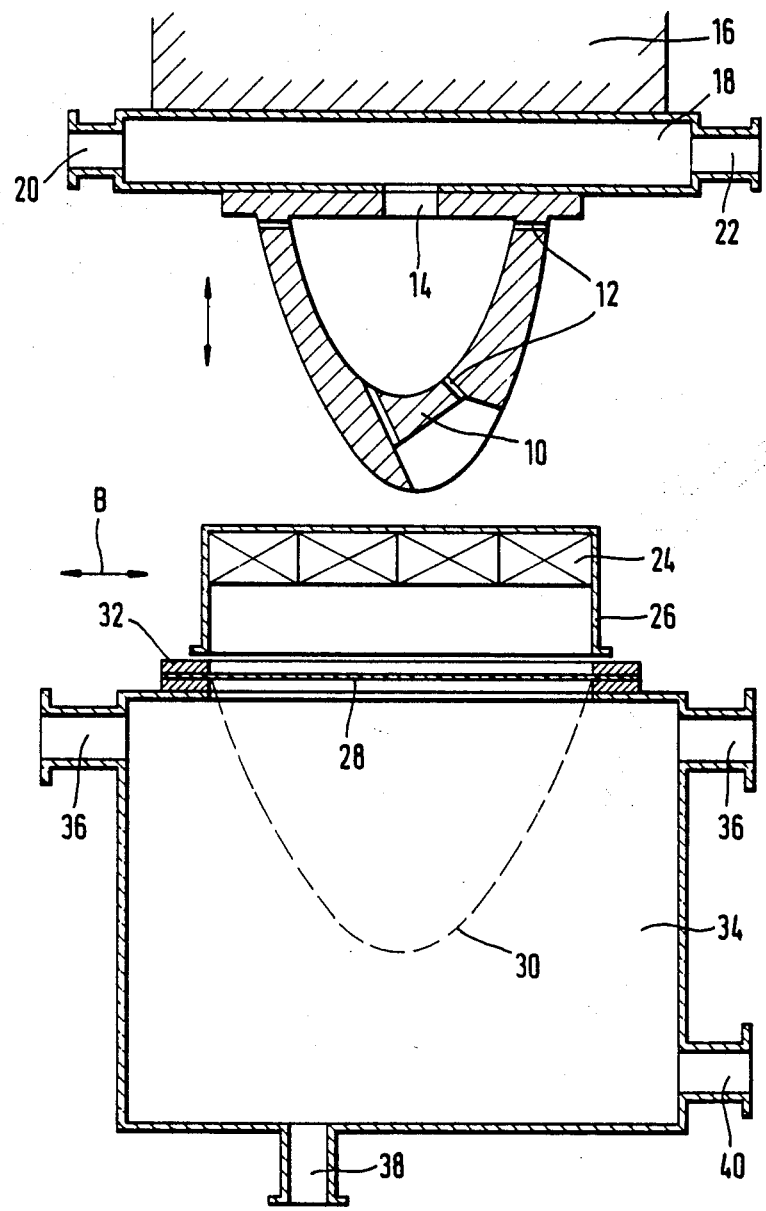
FIG. 1 is a schematic cross-sectional view of an apparatus for producing a molded plastic element by the presumed deep-drawing method.

The apparatus shown in FIG. 1 for performing the invention includes a molding tool 10 having a plurality of suction openings 12 and 14. The molding tool 10 itself is secured to a tool holder 16, which is movable vertically upward and downward via a crank drive, not shown here.

A tool holder 16 for receiving the molding tool 10 is embodied as a box-type holder reinforced with ribs, the hollow chamber 18 of which can be connected via a connection 20 and a flexible line to a high-vacuum system, not shown in detail here.

The hollow chamber 18 also discharges into a further connection 22 having a magnetic valve, not shown, with which the pressure can be equalized with the ambient air pressure after the deformation process.

As the heating source, an infrared projector 24 having a shade 26 on its sides is located beneath the molding tool 10 in FIG. 1, and the double arrow B indicates that this infrared projector 24 is disposed such that it is horizontally movable from side to side.

The apparatus also includes a tentering frame 32, in which a film 28 is fastened on all sides. The tentering frame 32 is disposed above a molding box 34 (suction box) that is open at the top, and the tentering frame 32 is likewise movable horizontally to the side.

The molding box 34 open at the top has connections 36 and 38 for a flow of supporting air as well as a further connection 40, via which a vacuum can be generated inside the molding box 34. In the underlying method, a large thick region of the film 28 is heated and brought to the plastic state, and since the film 28 in the plastic state has only a very slight thickness, the aforementioned supporting air flow acts from below upon the film 28 fastened in the tentering frame 32, to prevent sagging of the film during the heating process. The supporting air flow also assumes the function of cooling the embossed decorated side of the film 28.

In order to heat the film 28 fastened into the tentering frame 32, the infrared projector 24 is moved into the apparatus from the side into the position shown in FIG. 1. At the same time, supporting air is blown into the molding box 34 through the connections 36, and the supporting air can also flow to the outside via the opening 38. The speed of the outflowing air is a measure of the overpressure established in the molding box 34; the overpressure supports the film 28 during the heating process.

The film 28 is fastened inside the tentering frame 32 in such a way that the decorative side is remote from the infrared projector; that is, the back side of the film is heated by the infrared projector 24. Once the desired deformation temperature has been attained, the connections 36 and 38 are closed via valves, not shown in detail here, and at the same time a vacuum is applied to the connection 40. As a result, the film 28 is pre-deformed and assumes approximately the position indicated by a dashed line at reference numeral 30.

Only now does the infrared projector 24 move laterally into a holding position outside the deep-drawing apparatus, and the tool holder 16 along with the molding tool 10 is introduced abruptly into the molding box 36. At this instant, a high vacuum is applied to the molding tool 10 via the connection 20, the other connection 22 remaining closed.

At the same time, the connection 40 is also closed, and the connection 38 is opened, so that the air pressure of the ambient air is established in the molding box 34 and presses the film 28 with accurate contours against the molding tool 10. After a cooling-down period of approximately 30 seconds, the connection 20 is closed and the connection 22 is opened, so that the ambient air pressure can once again be established in the molding tool 10.

Now the molding tool 10 is moved upward once again, outside the molding box 34, into the position shown in FIG. 1, and the finished molded deep-drawn film can now be removed from the tentering frame 32.

Figure 2:
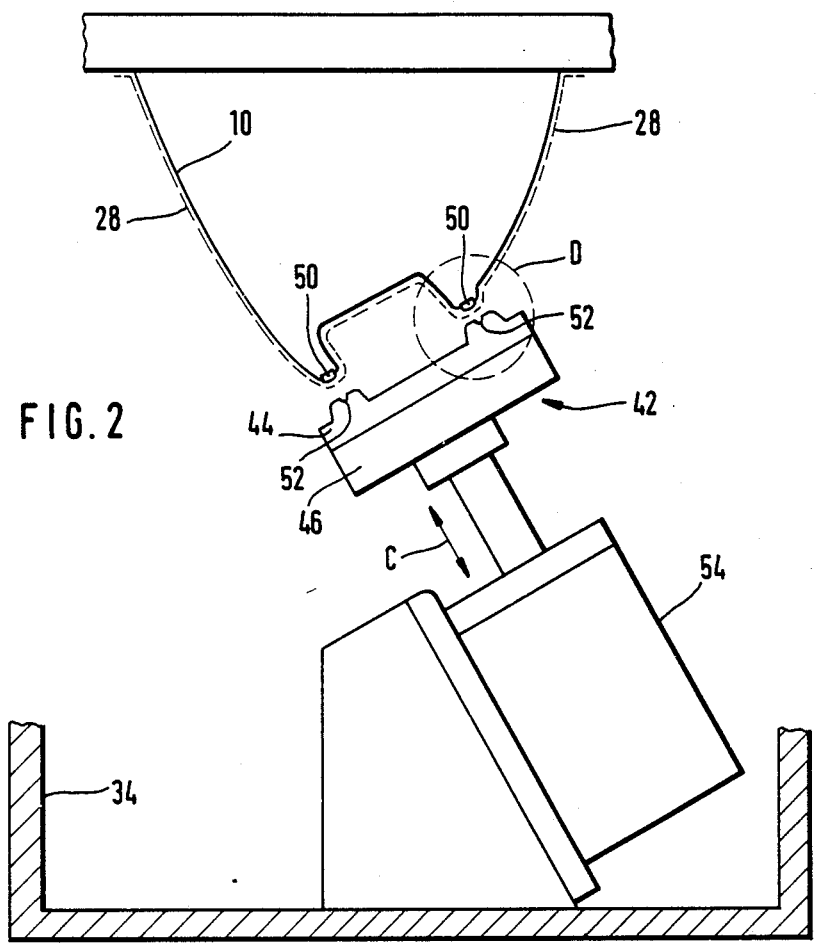
FIG. 2 is a schematic illustration of an embossing die, driven by a compressed-air cylinder, for producing decorative seams.

In the apparatus described thus far and described in further detail in European Patent Application No. 86 101 798.6 referred to above, an embossing die identified generally by reference numeral 42 is disposed inside the molding box 34 as shown in FIG. 2. The embossing die 42 includes an upper embossing layer 44, which is secured on a die holder 46. With the aid of a compressed-air cylinder 54, the embossing die 42 is movable in accordance with the double arrow C.

Two negative decorative seams 52, which in practical terms serve as the mold for the decorative seams to be produced, are located on the embossing layer 44.

Elastic embossing cushions 50, which are disposed in recesses 56 (see FIG. 3) of the molding tool 10, are glued into the molding tool 10 opposite the negative decorative seams 52.

Figure 3:
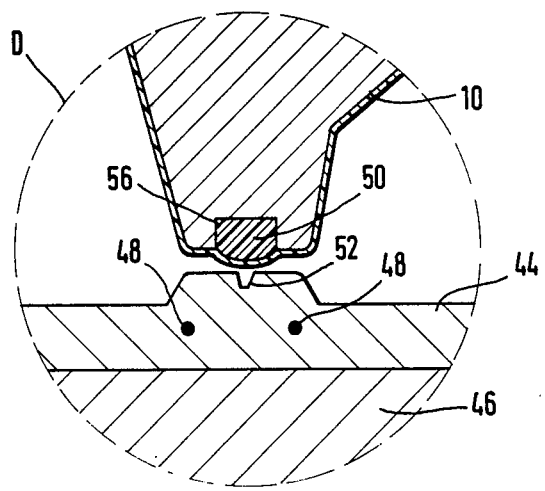
FIG. 3 is a detailed view of the detail marked D in FIG. 2.

As the detail view of FIG. 3, showing the detail D, illustrates, electrically heatable wires 48 are located inside the embossing layer 44, by which means the embossing layer 44 can be heated. To produce decorative seams, the electrically heated embossing die 42 is pressed briefly against the molding tool 10 covered with the film 28 by means of the compressed-air cylinder 54, at the instant of the deformation. By means of the elastic embossing cushion 50 glued into the molding tool 10, the decorative seam is made to form a convex curve.

For producing the original of the decorative seam to be produced, pieces of genuine leather are sewn together and coated with a pastelike silicon rubber composition, in which the wires 48 intended for electrically heating the embossing die 42 are embedded. After the hardening, the silicon rubber—which forms the embossing layer 44—is secured with the negative decorative seam 52 on the pneumatically actuatable die holder 46.

To produce durable seam marks, the embossing die 42 or embossing layer 44 is heated to approximately 160 C. This high temperature is as a rule higher than the later load temperature of the plastic element provided with the decorative seam, so that the desired thermal scar durability is assured. Furthermore, the heating of the embossing layer 44, makes the novel method readily applicable to the underlying deep-drawing molding method.

The tool costs for an apparatus for performing the novel method are very much less than in the powder slush method discussed at the outset herein, and furthermore the cycling time in the invention can be reduced to approximately one-sixth that of the powder slush method. In practice, cycles of approximately one minute are attainable with the invention.

What is claimed is:

1. An apparatus for deep-drawing a film comprising:
a die box having a top opening;
means for heating said film disposed above said top opening;
means for holding said film between said top opening and said heating means;
means for deforming said film by a pressure differential to obtain a deformed film within said die box;
retractable molding means insertable into said die box through said top opening for molding said deformed film to obtain a molded film;
means for embossing an ornamental seam on said molded film before retraction of said molding tool from said molded film, said embossing means disposed in said die box and comprising:
a die holder, and
a heated, soft, embossing layer attached to said die holder having an embossing surface with a negative decorative seam for embossing said ornamental seam; and
means for pressing said embossing means against said molding tool to obtain said ornamental seam on said molded film.

2. An apparatus according to claim 1 wherein said embossing layer is made from silicon rubber.

3. An apparatus according to claim 1 wherein said embossing layer is heated by embedded electrical wires.

4. An apparatus according to claim 1 wherein said heating means comprises an infrared projector.

5. An apparatus according to claim 1 wherein said infrared projector is horizontally movable.

6. An apparatus according to claim 1 further comprising an elastic embossing cushion attached to said molding tool and aligned with said embossing surface of said embossing layer, said elastic embossing cushion slightly protruding from said molding tool.

7. An apparatus according to claim 1 wherein said pressing means comprises a compressed air cylinder.

* * * * *